US006548439B2

(12) United States Patent
Wu et al.

(10) Patent No.: US 6,548,439 B2
(45) Date of Patent: Apr. 15, 2003

(54) HIGH STRENGTH AND HIGH SURFACE AREA CATALYST, CATALYST SUPPORT OR ADSORBER COMPOSITIONS

(75) Inventors: Shy-Hsien Wu, Horseheads, NY (US); Kenneth E. Zaun, Corning, NY (US)

(73) Assignee: Corning Incorporated, Corning, NY (US)

( * ) Notice: Subject to any disclaimer, the term of this patent is extended or adjusted under 35 U.S.C. 154(b) by 153 days.

(21) Appl. No.: 09/735,225

(22) Filed: Dec. 12, 2000

(65) Prior Publication Data

US 2002/0140138 A1 Oct. 3, 2002

Related U.S. Application Data

(60) Provisional application No. 60/173,592, filed on Dec. 29, 1999.

(51) Int. Cl.[7] .................. B01J 29/06; B01J 21/00; B01J 29/00
(52) U.S. Cl. .................. 502/64; 502/65; 502/67; 502/71; 502/73
(58) Field of Search ............... 502/64, 65, 67, 502/71, 73

(56) References Cited

U.S. PATENT DOCUMENTS

| | | | |
|---|---|---|---|
| 4,631,267 A | 12/1986 | Lachman et al. ........... 502/439 |
| 4,631,268 A | 12/1986 | Lachman et al. ........... 502/439 |
| 4,631,269 A | 12/1986 | Lachman et al. ........... 502/439 |
| 4,637,995 A | 1/1987 | DeAngelis et al. ......... 502/439 |
| 4,657,880 A | 4/1987 | Lachman et al. ............ 502/64 |
| 4,888,317 A | 12/1989 | DeAngelis et al. .......... 502/60 |
| 5,001,097 A | 3/1991 | Pecoraro .................... 502/68 |
| 5,179,053 A | 1/1993 | Subramanian et al. ....... 502/65 |
| 5,185,305 A | 2/1993 | Subramanian et al. ....... 502/65 |
| 5,244,852 A | 9/1993 | Lachman et al. ............ 502/66 |
| 5,292,991 A | 3/1994 | Lachman et al. ........... 585/850 |
| 5,316,991 A | 5/1994 | Subramanian et al. ....... 502/65 |
| 5,316,996 A | 5/1994 | Itoh ........................ 502/238 |
| RE34,804 E | 12/1994 | Lachman et al. ............ 502/64 |
| RE34,853 E | 2/1995 | DeAngelis et al. ......... 502/439 |
| 5,417,947 A | 5/1995 | Hertl et al. ............... 423/212 |
| 5,492,883 A | 2/1996 | Wu ........................ 502/439 |
| 5,500,199 A | 3/1996 | Bellussi et al. .......... 423/328.2 |
| 5,509,798 A * | 4/1996 | Feeley et al. ............... 431/7 |
| 5,565,394 A | 10/1996 | Lachman et al. ............ 502/64 |
| 5,589,147 A | 12/1996 | Farnos et al. ............ 423/239.2 |
| 5,607,892 A | 3/1997 | Chopin et al. ............. 502/304 |
| 5,626,826 A | 5/1997 | Chopin et al. ........... 423/213.2 |
| 5,633,217 A | 5/1997 | Lynn ....................... 502/439 |
| 5,958,829 A * | 9/1999 | Domsele et al. ............ 502/333 |
| 6,413,898 B1 * | 7/2002 | Faber et al. ................ 502/64 |

FOREIGN PATENT DOCUMENTS

JP 5184934 7/1993

\* cited by examiner

*Primary Examiner*—Wayne A. Langel
*Assistant Examiner*—Jonas N. Strickland
(74) *Attorney, Agent, or Firm*—Kees van der Sterre; Timothy M. Schaeberle

(57) ABSTRACT

Zeolite based material and a method for making the zeolite, comprising a zeolite having a silica/alumina ratio of at least 300 and a surface area of 250 m²/g and no greater than about 20 parts, by weight, of a silica binder. The combination of properties this zeolite based material exhibits includes the following: (1) a modulus of rupture of at least 1500 psi; (2) a surface area of at least 100 m²/g; (3) a coefficient of thermal expansion of less than about +/−10 ppm/° C.; and, (4) a thermal shock resistance of at least 850° C. The zeolite-based material can include a third component, specifically a gamma alumina having a specific surface area of greater than 100 m²/g.

11 Claims, No Drawings

HIGH STRENGTH AND HIGH SURFACE AREA CATALYST, CATALYST SUPPORT OR ADSORBER COMPOSITIONS

This application claims the benefit of U.S. Provisional Application No. 60/173,592, filed Dec. 29, 1999, entitled "High Strength and High Surface Area Catalyst, Catalyst Support or Adsorber Compositions", by Wu et al.

BACKGROUND OF THE INVENTION

1. Field of the Invention

The present invention relates to a improved zeolite/silica/alumina material and a method for making such material. In particular it relates to a zeolite/silica/alumina composite material exhibiting a high strength and a high surface area.

2. Background and Discussion of the Related Art

The Clean Air Act of 1970 requires that a catalytic converter be installed on an automobile to purify the exhaust gas stream. The catalytic converter removes unburned gasoline, carbon monoxide and nitrogen oxides simultaneously in the exhaust stream. A conventional catalytic converter consists of a multi-channel ceramic honeycomb and includes a high surface area material that is, along with the actual catalytic material (e.g., three-way catalyst (TWC)), washcoated onto the ceramic material. The monolithic ceramic honeycomb provides a strong substrate for the catalyst, in addition to meeting mechanical and thermal requirements. However, acting as an inert structure, the catalyst substrate does not participate in the chemical reactions for removal of unburned hydrocarbons, carbon monoxide and nitrogen oxides.

U.S. Pat. No. Re. 34,804 discloses the formation of extruded zeolite honeycomb bodies that include a permanent binder silicone resin component. An improved method for making the zeolite body is disclosed in U.S. Pat. No 5,492,883 (Wu) wherein the zeolite material is mixed with an aqueous silicone resin emulsion and, a temporary binder, such as methylcellulose, and the mixture is extruded to form a green honeycomb body, which is thereafter dried and sintered. Another improved method for making a zeolite body is disclosed in U.S. Pat. No. 5,633,217 (Lynn), wherein it is discloses the use of a dibasic ester as the solvent for the silicone resin and the use of a methylcellulose temporary binder. Finally, U.S. Pat. No. 5,565,394 (Lachman et al.) discloses improved zeolite bodies that include a thermal expansion control component such as calcium silicate, permanent binder such as silica or alumina and a temporary binder such as methylcellulose. Although the zeolites disclosed in the Wu, Lynn and Lachman references are not inert and are capable of use as a catalyst material, they each require the application of a precious metal washcoat in order to function as a three-way catalyst capable of the conversion of hydrocarbons, nitrogen oxides and carbon monoxide into their nontoxic gaseous counterparts.

For zeolite based materials to be used as monolithic honeycombs at increased temperatures (>300° C.) the zeolite material should exhibit the following combination of properties, not currently possessed by conventional zeolite bodies: high strength, high surface area, high thermal stability (i.e. high thermal shock resistance) and a low coefficient of thermal expansion. There is, accordingly, a clear need for, and thus an object of the present invention is to provide, a zeolite material exhibiting the aforementioned requisite properties.

SUMMARY OF THE INVENTION

The object of the present invention is to solve the above problems of the prior art and to provide high strength, high surface area zeolite material exhibiting a high thermal stability and low thermal expansion.

Specifically, the invention is directed at a zeolite based material for use as a catalyst substrate, adsorber or catalyst carrier comprising a zeolite having a silica/alumina ratio of greater at least 300 and a surface area of 250 m$^2$/g and no greater than about 20 parts, by weight, of a silica binder. The properties this zeolite based material exhibits includes the following: (1) a modulus of rupture of at least 1500 psi; (2) a surface area of at least 100 m$^2$/g; (3) a coefficient of thermal expansion of less than about +/−10 ppm/° C.; and, (4) a thermal shock resistance of at least 850° C.

In a separate embodiment the zeolite-based material includes a third component, specifically gamma alumina having a specific surface area of greater than 100 m$^2$/g.

This invention also relates to a method for producing an extruded honeycomb monolith having the aforementioned high strength and surface area properties, comprising mixing into a substantially homogeneous body the following components: (1) a zeolite having a silica/alumina ratio of at least 300 to 1 and a surface area of at least 250 m$^2$/g; (2) no greater than 20 parts, by weight, of a silica binder derived from using a resin/solvent mixture having a ratio ranging between from 2/1 to 4/1; (3) a temporary binder; and, (4) water. Following mixing of the raw materials, the method involves extruding the mixture to form a green honeycomb structure, and then drying the structure for a time sufficient to form a crack-free dry structure. Once the extruded body is dried, the method next involves heating the dried honeycomb structure in a nitrogen atmosphere, to a first temperature of at least 500° C., cooling to ambient, and thereafter, heating, in air, to a second temperature of at least 850° C. to form a sintered structure.

DETAILED DESCRIPTION OF THE INVENTION

"The product of the present invention is a zeolite body for use as an adsorber or catalyst carrier, specifically a zeolite-based material wherein the zeolite exhibits a silica/alumina ratio of at least more than 300 and a surface area of at least 250 m$^2$/g. Expressed in parts by weight, the zeolite based bodies, according to the invention, characteristically contain between about 30 to 90 parts, by weight, zeolite and not more than 20 parts, by weight, silica binder."

Typically, zeolites comprise large particles on the order of several microns and exhibit a regular array of accessible micropores, a combination that provides the high surface attribute of zeolites; a feature that is retained by zeolites after sintering. Generally, such catalyst support and adsorber applications require substantial overall surface areas of at least 20 m$^2$/g, preferably greater than 100 m$^2$/g, and most preferably greater than 150–200 m$^2$/g. The inventive zeolite based body is capable of being extruded into a high cell density, thin walled monolithic body, e.g., a honeycomb structure exhibiting at least 400 cells/in$^2$, exhibiting surface areas of at least 200 m$^2$/g, with surface areas in excess of 250 m$^2$/g being readily attainable.

As detailed above, the zeolite component is desirably a high silica-containing zeolite exhibiting a SiO$_2$/Al$_2$O$_3$ molar ratio of at least 300. The presence of a zeolite having the requisite high silica/alumina ratio provides for a zeolite-based material having both a thermal stability at those high temperatures typically experienced in the exhaust environment, and the expected ability to adsorb and desorb hydrocarbons. In other words, the high silica content of the zeolite provides the composite with the ability to maintain its structure at high temperatures. On the other hand, the presence of a low alumina content in the zeolite ensures that the zeolite will not experience the type of moisture problems typically associated with zeolites having high alumina content; high alumina zeolites typically de-aluminate in the presence of moisture at high temperatures. Furthermore, the zeolites crystalline silica phase is maintained at high temperatures and is responsible for the negative CTE characteristic that compensates to reduce the overall thermal expansion of the composite body. In sum, the inventive material provides for a zeolite adsorber material that allows the automotive exhaust system designer a certain degree of flexibility in exhaust system design; adsorber material having increased thermal stability.

Suitable zeolites include any silica-based zeolite having the requisite very high silica/alumina ratio. Useful high silica/alumina ratio-containing zeolites for the practice of the invention can be found among the zeolites selected from the following: mordenite, ultrastabilized Y (USY), ZSM-5, ZSM-8, ZSM-11, ZSM-12, Hyper Y, beta-zeolites, H-ferrierite, H-offretite, faujasite, X zeolite, type L zeolite, mazzite, EMC-2, and combinations of these, preferably silicalite, and any of the natural zeolites including erionite, clinoptilolite, chanazite and phillipsite. One commercially available zeolite having the requisite high silica property is CBV 3002 available from the PQ Corporation.

In addition to a high surface area, other features of this zeolite body that make it suitable for use as an adsorber material include its relatively low thermal expansion and high thermal stability; less than 10 ppm/° C., preferably 5 ppm/° C., and thermal stability up to at least 1000° C., respectively. Furthermore, catalyst support applications and filter/adsorber applications preferably require a flexural strength in excess of 1500 psi. The zeolite body of the instant invention exhibits flexural and crushing strengths that exceed this value and are on the order of greater than about 1500 psi, with MOR's in excess of 3500 psi being attainable.

A second embodiment of the inventive zeolite body comprises the inclusion of a third component, a gamma alumina having a surface area of greater than 100 m2/g. The gamma alumina component having the high surface area also contributes to result in an overall zeolite-based body that is well within the surface area requirements of many catalyst support applications. Expressed in parts by weight, the zeolite/silica/alumina bodies, according to the invention, characteristically contain between about 85 to 90 parts, by weight, zeolite and 10–15 parts, by weight, silica binder, and up to 50, parts, by weight, alumina.

Although the presence of silica prevents the incorporation of PGM catalysts into the extruded zeolite substrate, due to silica's known PGM incompatibility, the presence of alumina in this embodiment provides the zeolite-based composite structure the support material function for non-PGM catalysts. Specifically the gamma alumina provides the necessary sites to enable binding of transition metal oxide catalyst to the structure, such that the composite will have enhanced catalytic activity and lifetimes over zeolite-only structures, when used in the certain harsh environments typically associated with high temperature, such as seen in chemical processing applications. Additionally, the alumina, whereby the transition metal oxides are typically sited is porous enough and exhibits a high enough surface area porous structure so as to inhibit sintering of the metal oxides present and to provide for the accessibility of the transition metal oxides to the reactant stream.

Gamma alumina suitable for use in the formation of this composite include those aluminas that after calcining provide the requisite gamma alumina phase and exhibit a sufficiently high surface area suitable for functioning as the catalytic support material. A suitable commercially available gamma alumina having the requisite high surface area characteristic is GL-25 supplied by LaRoche Industries.

In another embodiment, the zeolite body should include a stabilized high surface area alumina. The stabilized alumina should include an amount of stabilizing agent selected from the group consisting of lanthanum oxide ($La_2O_3$) or it equivalents, including barium oxide, strontium oxide and yttrium oxide. These stabilizing agents are known for stabilizing the specific surface area of the alumina, which in its pure form is typically unstable at high temperatures. Specifically, the stabilizing agents inhibit the phase transformation of alumina at high temperatures, thereby increasing the high temperature stability of the alumina. The stabilizing agents are typically included in the alumina as a pre-dopant prior to the batching of the composite, and more preferably they are added to the composite after firing via an impregnation process.

A preferred stabilizing agent for the alumina is lanthanum oxide ($La_2O_3$), which is included by impregnation into the gamma alumina component of the composite. Lanthanum impregnation is such that the composite includes lanthanum oxide in the weight range of 0.5–20, parts, by weight, with respect to the alumina component amount. If lanthanum is added in an amount less than such range, then the beneficial effect of increase in activity due to the lanthanum addition is not observed.

For catalyst applications, porosity, as measured by total porosity, of the zeolite/alumina composite should be sufficient to permit access to the transition metal oxide catalyst through the walls. For adsorber applications, porosity, as measured by average pore size, should be sufficient to allow the support to function effectively as an adsorber. The range of choice, for total porosity and average pore size, may be varied to accommodate the proposed catalyst or adsorber applications. Porosity is dependent upon the raw materials and the firing temperature, the higher the temperature the more dense the resulting structure. For catalyst and/or catalyst support applications, the inventive zeolite structures may exhibit a total porosity of about at least about 30%, along with sub micron average pore sizes.

In addition to its use as a simple adsorber structure, as detailed above, the inventive high silica/alumina zeolite material can be used as a catalyst substrate, specifically, as a replacement for cordierite. Alternatively, the inventive zeolite can be used as a catalyst substrate in those applications where it performs the additional function of adsorbing hydrocarbon during the cold-start stage (e.g., Bag I and II emissions).

In the first catalyst substrate embodiment, the zeolite honeycomb substrate is washcoated with a conventional three-way catalyst, and catalyst system performs in the same manner as a regular cordierite supported three-way catalyst system. Suitable catalytic materials for supporting on the high silica/alumina zeolite substrate include platinum, palladium, rhodium and iridium. The zeolite substrate is comprised of a zeolite material that exhibits high thermal stability under automotive exhaust conditions. Suitable zeolites include those selected from the following materials: mordenite, ultrastabilized Y (USY), ZSM-5, ZSM-8, ZSM-11, ZSM-12, all exhibiting a silica/alumina ratio of 300 and above.

In the second embodiment, the zeolite substrate is washcoated with an oxidation catalyst; suitable oxidation catalysts including platinum, palladium rhodium or iridium. The washcoated zeolite catalyst functions as a hydrocarbon trap for reducing hydrocarbon emissions during the cold-start stage. Zeolite material choices for the substrate include the following: beta-zeolite, USY and ZSM-5 and mordenite, all exhibiting the requisite high silica/alumina ratio of 300 or above. These large pore zeolites exhibit a large capacity for the adsorption of hydrocarbon, while at the same time exhibiting requisite thermal stability to survive the harsh environment in an automotive exhaust stream. Once the washcoated oxidation catalytic material reaches a sufficient material it functions to destroy harmful hydrocarbon molecules by oxidizing these molecules, with oxygen present in automotive exhaust stream, to environmentally benign molecules such as water and carbon dioxide.

The general method of producing porous sintered substrates, as one skilled in the art can appreciate, is by mixing batch materials, blending the mixture, forming a green body, and subsequently sintering the green body to a hard porous structure. In the manner of making the body various lubricants, such as zinc stearate and sodium stearate, and organic binders are added to the batch during the mixing step to provide viscosity control and strength prior to firing and porosity to the after fired structure.

A particularly preferred method for producing the composite of the invention described herein, an extruded honeycomb monolith having a high surface area, comprises mixing into a substantially homogeneous body certain raw materials capable of forming the aforementioned composite. Specifically, the raw materials that will form a composite include a zeolite raw material that exhibits a silica/alumina ratio of at least 300 to 1 and a surface area of at least 250 $m^2/g$, a silica binder exhibiting a resin/solvent ratio of between 2/1 to 4/1 and, optionally, a gamma alumina component exhibits a specific surface area of greater than 100 $m^2/g$. As is standard in the formation of ceramic structures, the batch mixture should include a temporary organic binder and water. The preferred method of forming the body includes extruding the body to form a green honeycomb structure. Once formed into a honeycomb body the extruded green body is then dried by heating the structure for a time period sufficient to form a crack-free dry structure.

The drying step is accomplished in a number of different ways. One embodiment involves placing the structure in an oven at a temperature in the range of 50 to 100° C., preferably, at a temperature in the range of 90 to 100° C. for periods of up to 4 days. In another, slightly modified, embodiment the drying step is accomplished by placing the green structure in a relative humidity controlled oven (e.g., 90% relative humidity) for similar time periods and temperatures as for the aforementioned standard oven-drying embodiment. In a third embodiment, the drying step is accomplished by placing the green structure in a dielectric oven for a period of time sufficient to form a crack-free, self-supporting structure, preferably, a period of no greater than 60 minutes, more preferably for a period of 5 to 30 minutes.

Sintering of the dried honeycomb structure involves heating or sintering the honeycomb for a time period sufficient to form a sintered structure having a high surface area. Specifically the sintering comprises heating the honeycomb in a nitrogen atmosphere, at a rate 10–25° C./hr, to a first temperature of at least 500° C., preferably this temperature is then maintained for period of up to 10 hours, more preferably 4 hours. Following this nitrogen pretreatment firing, the honeycomb is cooled to ambient temperature. Once ambient temperature is attained, the honeycomb is heated, in air, to a second temperature of at least 850° C., preferably 1100° C. This second air-heating step, to at least 850° C., may involve two distinct heating steps: (1) a first heating step, at a rate of between 10–25° C./hr to 500° C., whereupon the temperature is held for period of time; and, (2) and a second heating step from 500° C. to at least 850° C., at a rate of about 50° C./hr, whereupon the temperature is again held for a period of time. For both air-heating steps, the temperature-holds are preferably maintained for period of up to 10 hours, and more preferably 4 hours.

The pre-treatment nitrogen heating step is thought to result in sintered structures exhibiting an increased MOR over those bodies not subject to this pre-treatment step. While not intending to be limited by theory it is thought that the nitrogen pre-treatment produces a gradual slow burnout of the organic binder that does not disrupt the microstructure of the zeolite bodies, thus allowing for easier densification of the zeolite body at the later achieved higher firing temperatures.

The purpose of the organic binder is to provide plasticity during forming, and some green strength after drying. Organic binder according to the present invention refers to cellulose ether type binders and/or their derivatives, some of which are thermally gellable. Some typical organic binders according to the present invention are methylcellulose, hydroxybutylcellulose, hydrobutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof. Methylcellulose and/or methylcellulose derivatives are typically used in the practice of the present invention. Methylcellulose, hydroxypropyl methylcellulose, and combinations thereof are especially preferred. Preferred sources of cellulose ethers and/or derivatives thereof, are Methocel A4M, F4M, and F240M from Dow Chemical Co. Methocel A4M is a methylcellulose binder having a gel temperature of 50–55° C. and gel strength of 5000 $g/cm^2$ (based on 2% solution at 65° C.). Methocel F4M and F240M are hydroxypropyl methylcellulose.

EXAMPLES

To further illustrate the principles of the present invention, there will be described certain examples of zeolite and zeolite/alumina bodies formed according to the invention, as well as a comparative body. However, it is to be understood that the examples are given for illustrative purpose only, and the invention is not limited thereto, but various modifications and changes may be made in the invention, without departing from the spirit of the invention.

Examples 1 and 2

Both examples involved thoroughly mixing together in a Littleford mixer a batch mixture as provided Table I. The zeolite raw material comprised a ZSM-5 zeolite having an $SiO_2/Al_2O_3$ ratio of 300 (CBV-3002 from PQ Corporation) and a silica binder comprising an amount of a concentrated silicone resin (6-2230 resin from Dow Corning) dissolved in a dibasic ester solution with the resin/solvent ratio reported in the Table; in each example the amount of resin resulted in the amount of silica permanent binder reported in the fired composition. The mixed batch was transferred to a muller and an amount of water, in as reported in Table I, was added to the batch and the batch was uniformly plasticized; the water listed as a superaddition weight percent based on the fired composition.

Honeycomb bodies with a wall thickness of about 8 mil and exhibiting 400 cells/in$^2$ and rods suitable for testing MOR, exhibiting a diameter of 0.3125 in. were formed by extrusion through a ram extruder. Each of the two examples, green extruded honeycombs and the rods, were dried in the following manner: RT to 95° C. in a humidity oven (95–100% relative humidity) for a period of 4 days. After drying, the extruded honeycombs and rods were pre-fired in an N$_2$ atmosphere at a rate of between 15–25° C./hr. to 500° C., where temperature was held for a period of 4 hours. The honeycombs were cooled to room temperature and then heated in air, at a rate of between 15–25° C./hr, to a temperature of 500° C., where again the temperature was held for a period of 4 hours. Following this hold, the firing involved heating the honeycombs, at a rate of between 25–50° C./hr, to a final temperature of 1100° C., where the honeycombs were held for a final period of 4 hours. The composition of the fired body is reported in Table I.

The resultant rods were used for characterization of mechanical properties such as MOR, CTE, and E-modulus. The thermal shock resistance was calculated according to the following formulas: TSR=MOR/(E-mod X CTE). The porosity and mean pore size data was measured for the honeycombs and was generated utilizing a conventional mercury intrusion porosimetry technique. All of these physical properties for the canes and honeycomb are detailed listed in TABLE I.

Examples 3–7

Each example involved thoroughly mixing together in a Littleford mixer a batch mixture as provided Table I. The zeolite raw material comprised a ZSM-5 zeolite having an SiO$_2$/Al2O$_3$ of 300 (CBV-3002 from PQ Corporation), the gamma alumina raw material comprised GL-25 supplied from LaRoche Industries (surface area of 260 m$^2$/g), and the methylcellulose temporary binder comprised Methocel A4M from the Dow Chemical Co. One variation included utilizing a La-stabilized gamma alumina in Example 7; doped with 4% La$_2$O$_3$ and having a surface area of 110 m$^2$/g). The batch mixture additionally comprised an amount of a concentrated silicone resin (6–2230 resin from Dow Corning) dissolved in a dibasic ester solution having the resin/solvent ratio reported in the Table; in each example the amount of resin resulted in the amount of silica permanent binder reported in the fired composition. Following treatment with an amount of oleic acid and/or acetic acid, as reported in the table, the mixed batch then was transferred to a muller and amount of water, as reported in Table I, was added to the batch and the batch was uniformly plasticized; note that each of the weight percents listed in Table 1 for the water, oleic and acetic acids are superaddition weight percents based on the final fired composition.

Honeycomb bodies with a wall thickness of about 8 mil and exhibiting 400 cells/in$^2$ and rods suitable for testing MOR, exhibiting a diameter of 0.3125 in. were formed by extrusion through a ram extruder. The green extruded honeycombs and rods of Examples 3–5 and 7 were dried in manner similar to that for Examples 1 and 2. Example 6 was dried in a dielectric oven for a period of 20 minutes. After drying, the extruded honeycomb and rod green bodies were fired in a manner similar to that utilized for Examples 1 and 2 with the exception that the temperature was not held at 500° C., following the second ramp-up, in air.

The final fired composition, physical and mechanical properties of the extruded zeolite/silica/alumina bodies are shown in TABLE I.

TABLE I

| | 1 | 2 | 3 | 4 | 5 | 6 | 7* |
|---|---|---|---|---|---|---|---|
| Batch Mixture (Grams) | | | | | | | |
| Zeolite | 810 | 765 | 630 | 450 | 270 | 450 | 450 |
| Gamma Alumina | — | — | 90 | 270 | 450 | 270 | 360 |
| Silicone Resin | 343.8 | 441.9 | 523.2 | 523.2 | 523.2 | 523.2 | 294.3 |
| Temporary Binder | 54 | 54 | 54 | 54 | 54 | 54 | 54 |
| Water (%) | 30.0 | 31.1 | 24.5 | 32.2 | 32.2 | 32.2 | 58.9 |
| Oleic Acid(%) | — | — | 4 | 4 | 2 | 4 | 2 |
| Acetic (%) | — | — | — | — | 2 | — | — |
| Resin/solvent ratio | 4:3 | 2:1 | 3:1 | 3:1 | 3:1 | 3:1 | 2:1 |
| Fired Composition | | | | | | | |
| Percent Zeolite | 90 | 85 | 70 | 50 | 30 | 50 | 50 |
| Percent Gamma Alumina | — | — | 10 | 30 | 50 | 30 | 40 |
| Percent Silica | 10 | 15 | 20 | 20 | 20 | 20 | 10 |
| Properties | | | | | | | |
| Surface Area (m$^2$/g) | 380 | 235 | 255 | 235 | 170 | 205 | 225 |
| Porosity (%) | 33.0 | 35.4 | 31.7 | 31.9 | 35 | 32.4 | 43.6 |
| Mean Pore Size ($\mu$) | 0.37 | 0.47 | 0.39 | 0.31 | 0.20 | 0.32 | 0.21 |
| Modulus Of Rupture (psi) | 1520 | 3410 | 3758 | 2960 | 2270 | 3036 | 483 |
| Crush Strength (psi) | 2670 | 3300 | 4609 | 2531 | 1400 | 3043 | 794 |
| Elastic Modulus ($\times 10^6$ psi) | | 1.90 | | 1.75 | | | |
| Mean Coefficient Of Thermal Expansion (ppm/° C.) | | −1.38 | | 1.12 | | | |

TABLE I-continued

|  | 1 | 2 | 3 | 4 | 5 | 6 | 7* |
|---|---|---|---|---|---|---|---|
| Calculated Thermal Shock Resistance (° C.) |  | 1301 |  | 1510 |  |  |  |

*Comparison Example

An examination of TABLE I, reveals that each of the inventive samples 1 and 2, zeolite/silica binder bodies, exhibit the requisite combination of properties. Specifically, the inventive samples 1 and 2 exhibit the following combination of properties: (1) a surface area of not less than 235 $m^2/g$; (2) an MOR of at least 1520 psi; (3) a negative CTE less than 2 ppm/° C.; and, (4) a calculated thermal shock resistance of greater than 1300° C.

An examination of TABLE I, reveals that the, inventive samples 3–6, containing a gamma alumina ranging from 10 to 50 parts, by weight, exhibit the requisite combination of properties. Specifically, the inventive samples 3–6 exhibit the following combination of properties: (1) a surface area of not less than 170 $m^2/g$; (2) an MOR of at least 2270 psi; (3) a CTE less than 2 ppm/° C.; and, (4) a calculated thermal shock resistance of at least 1510° C.

Referring to Example 7, zeolite/silica body comprising 10 parts, by weight silica, TABLE I reveals that this sample has a less than desirable MOR of 483 psi. This low strength is likely due low amount of silica binder present, specifically an amount not sufficient to cover the vast surface area of the 90 parts, by weight combined, of the zeolite and gamma alumina.

It should be understood that while the present invention has been described in detail with respect to certain illustrative and specific embodiments thereof, it should not be considered limited to such, as numerous modifications are possible without departing from the broad spirit and scope of the present invention as defined in the appended claims.

We claim:

1. A zeolite composite exhibiting a modulus of rupture strength of at least 1500 psi, a surface area of at least 100$m^2/g$, a coefficient of thermal expansion of less than about +/−10 ppm/° C. and a thermal shock resistance of at least 850° C., said composite being formed from a mixture comprising, in weight percent:

30 to 70% of a zeolite having a silica/alumina ratio of greater than 300 and a surface area of greater than about 250 $m^2/g$, no greater than about 20% silica binder, and 10–50% gamma alumina having a specific surface area of greater than 100 $m^2/g$.

2. A zeolite composite according to claim 1 wherein the composite exhibits a surface area of at least 200 $m^2/g$.

3. A zeolite composite according to claim 1 wherein the composite exhibits a thermal expansion of less than about 5 ppm/° C.

4. A zeolite composite according to claim 1 wherein the body exhibits thermal stability at a temperature up to at least 1000° C.

5. A zeolite body according to claim 1 wherein the body exhibits a modulus of rupture of at least 2000 psi.

6. A zeolite composite as claimed in claim 1 wherein the alumina includes a stabilizing agent selected from the group consisting of lanthanum oxide, barium oxide, strontium oxide and yttrium oxide.

7. A zeolite body exhibiting a modulus of rupture strength of at least 1500 psi, a surface area of at least 100 $m^2/g$, a coefficient of thermal expansion of less than about +/−10 ppm/° C. and a thermal shock resistance of at least 850° C., said body being formed from a mixture comprising:

a zeolite having a silica/alumina ratio of at least 300 and a surface area of greater than about 250 $m^2/g$;

no greater than about 20% by weight of silica binder; and optionally, up to 50% by weight of a gamma alumina having a specific surface area of greater than 100 $m^2/g$.

8. A zeolite body according to claim 7, comprising about 85 to 90%, by weight of the zeolite and 15–20% by weight of the silica binder.

9. A zeolite body according to claim 7, exhibiting a surface area of at least 170 $m^2/g$.

10. A zeolite body according to claim 7 having a modulus of rupture of at least 2000 psi.

11. A zeolite body according to claim 7 consisting of an extruded honeycomb structure exhibiting at least 400 cells/$in^2$.

* * * * *